(No Model.)  2 Sheets—Sheet 1.
W. W. DOOLITTLE.
TAPPING MACHINE.
No. 490,273.  Patented Jan. 24, 1893.
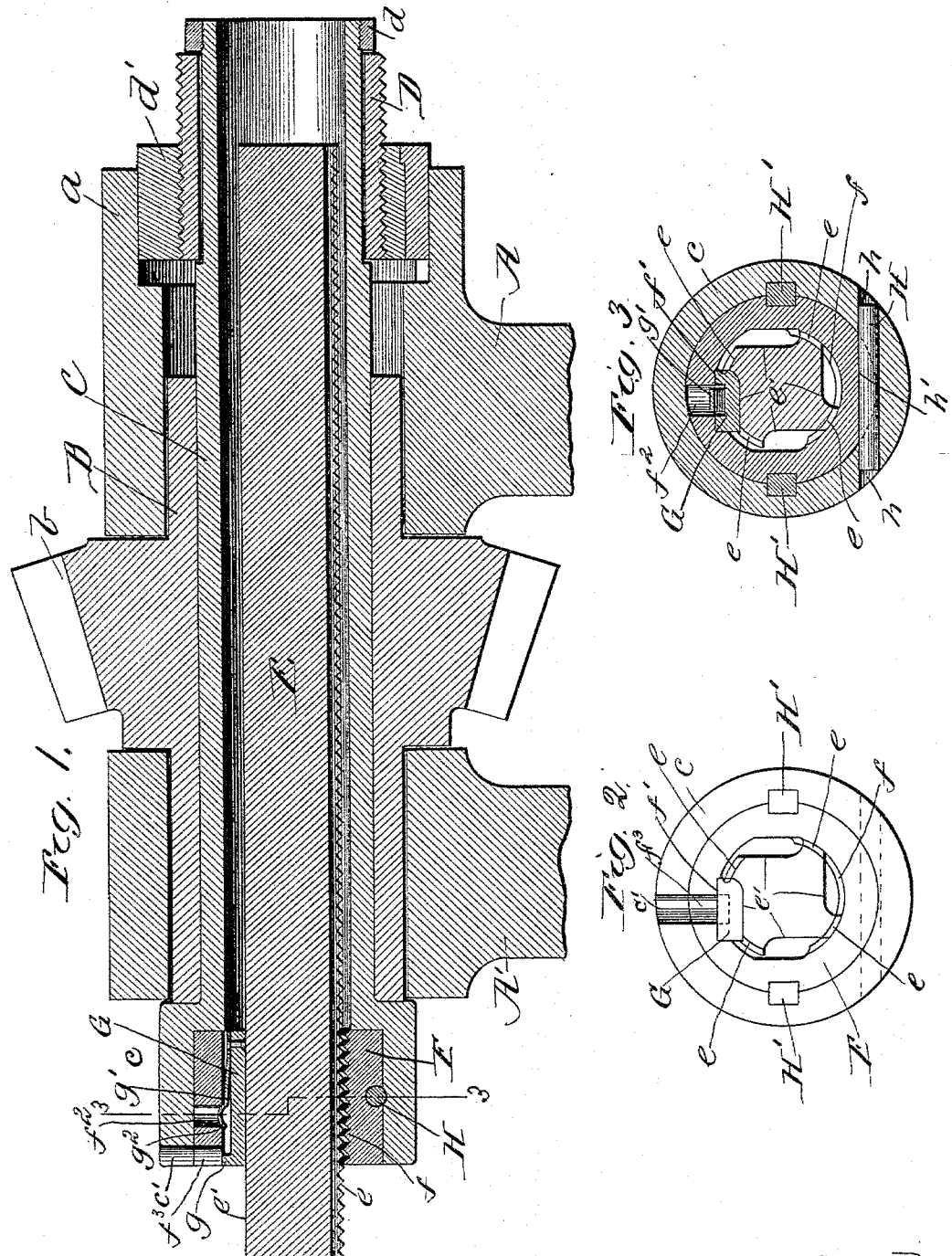
Witnesses
W. C. Coolico
Fred'k H. Mills.
Inventor
William W. Doolittle,
By Coburn & Thacher
Att'ys
THE NORRIS PETERS CO., PHOTO-LITHO., WASHINGTON, D. C.

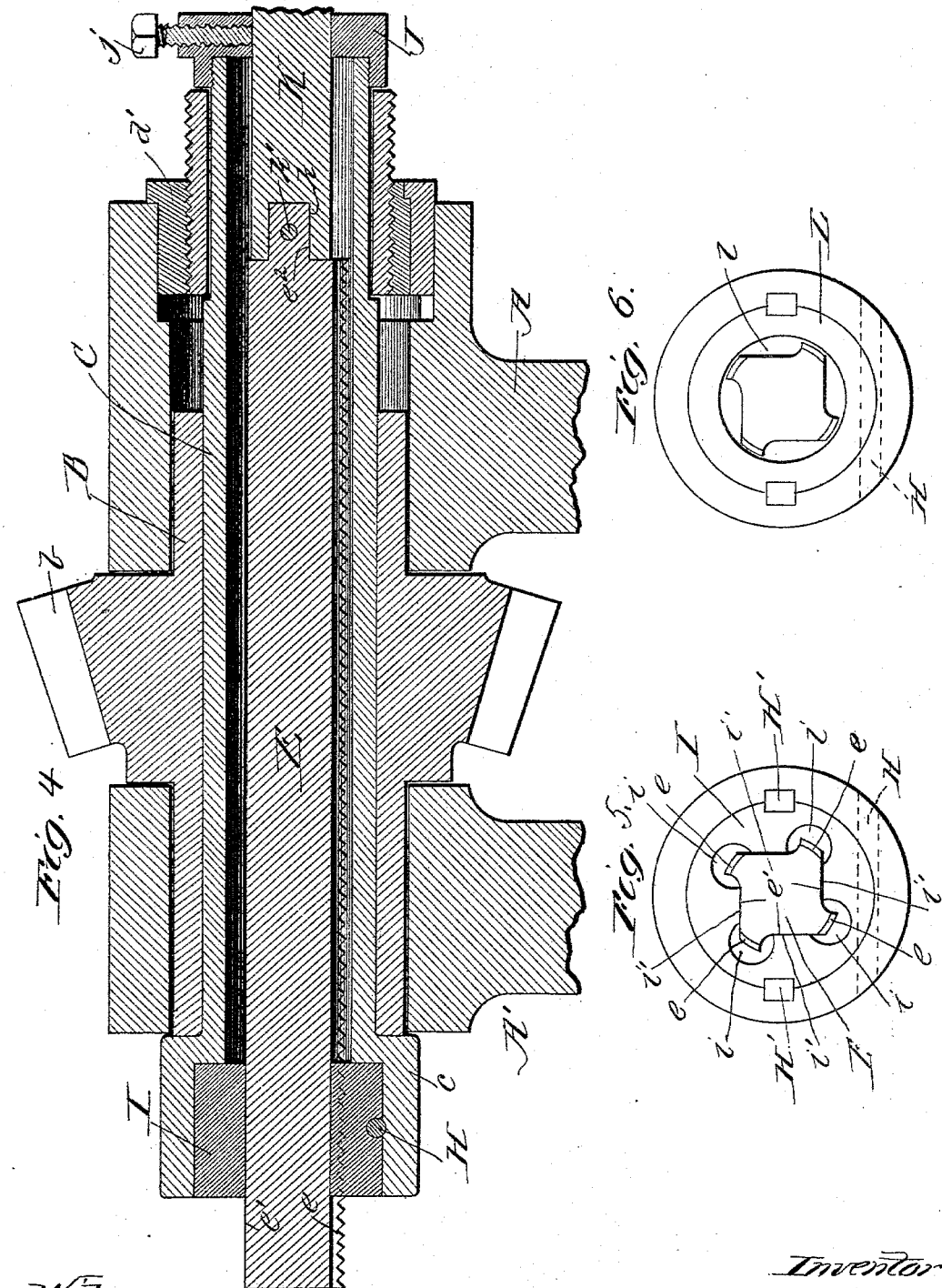

UNITED STATES PATENT OFFICE.

WILLIAM W. DOOLITTLE, OF CHICAGO, ILLINOIS, ASSIGNOR TO THE CRANE COMPANY, OF SAME PLACE.

TAPPING-MACHINE.

SPECIFICATION forming part of Letters Patent No. 490,273, dated January 24, 1893.

Application filed February 15, 1892. Serial No. 421,606. (No model.)

*To all whom it may concern:*

Be it known that I, WILLIAM W. DOOLITTLE, a citizen of the United States, residing at Chicago, in the county of Cook and State of Illinois, have invented certain new and useful Improvements in Tapping-Machines, which are fully set forth in the following specification, reference being had to the accompanying drawings, in which—

Figure 1, represents a longitudinal section of a tap and its holder embodying my invention. Fig. 2, a front end elevation of the same. Fig. 3, a cross section of the same taken on the broken line 3—3 Fig. 1. Fig. 4, a longitudinal section similar to Fig. 1, showing a modification in construction. Fig. 5, a front elevation of the same, and Fig. 6, a similar end elevation showing another modification.

My invention relates to tapping machines in which the tap is driven by power and which are designed for rapid work.

The invention relates to the construction of the tap and holder and means for securing the tap in its holder; and the invention consists in special means for securing a long tap within its holder, whereby it is fastened in working position in said holder and also may be adjusted lengthwise to replace worn-out sections with fresh, unworn cutting surfaces.

I will describe in detail the construction and operation of a tap and its holder in which I have embodied my invention in one particular way, and the particular improvements which I believe to be new and wish to secure by Letters Patent, will be pointed out more definitely in special claims.

I have not shown and shall not attempt to describe all the parts of a tapping machine, for it is a machine well known and in common use, and my improvement is applicable to any ordinary tapping machine.

In the drawings, A and A' represent the arms of the usual stationary head of the machine, in which the mandrel B, is mounted, and this rotating mandrel is in this instance shown provided with a bevel gear pinion $b$, by means of which it is driven. In this mandrel there is mounted a long tubular chuck C, or tap holder, which passes through the mandrel, and the latter is secured thereto in any suitable way so that the two will rotate together. This tubular holder is enlarged somewhat at its front end to provide a hollow head $c$, the interior tubular space being also enlarged to a diameter somewhat greater than the main portion of the holder. The opposite or rear end of the tube is open and is mounted in a sleeve D, the diameter of which is a little less than the outer diameter of the tube, the latter being cut down slightly to enter the former, as seen in Fig. 1. This extreme end of the tube is threaded a little distance and a nut $d$ turned thereon, by means of which the tube is held in place within the sleeve. The sleeve itself is threaded externally and an internally threaded ring $d'$ is turned thereon and is itself seated in an enlargement $a$ at the outer end of the mandrel bearing in the arm A. The tubular chuck is thus held from any possible movement lengthwise, and at the same time is free to turn in this sleeve bearing at its rear end.

The tap E, is of ordinary construction, except that it is of greater length, in fact many times the length of the working section brought into use at any one time. It is provided with the usual sections $e$ of cutting teeth, running its entire length and with the flat spaces or surfaces $e'$ between these sections. This tap is mounted within the tubular chuck C by suitable devices which will hold it from any movement therein, so that it will be rotated with the chuck, but at the same time will permit the adjustment of the tap lengthwise for the purpose of bringing a new section of cutting teeth into working position as the projecting sections of these cutters become worn out and useless.

In Figs. 1, 2, and 3, of the drawings, the device for fastening the tap in the chuck is a ring or short sleeve F, which is adapted to fit the enlarged opening in the head $c$ of the chuck. This short sleeve is provided with a section $f$ of internal threads extending part way around the ring and adapted to the thread cutters of the tap, so that when the latter is fitted into the former, as seen in Figs. 1 and 2, it will be held from longitudinal movement by this threaded connection. An angular seat or recess $f'$ is cut in the interior face of this same sleeve, opposite to the threaded section.

This recess is like a groove running the length of the sleeve, and is adapted to seat a key G, which holds the tap from rotating in the sleeve, by bringing the latter into such position that one of its flat spaces $e'$ will be directly opposite this seat; the key is then inserted at the front end and will fasten the tap against turning in the sleeve, as will be obvious from an inspection of Figs. 2 and 3. In order to secure the key in place a groove is cut on its upper face almost its entire length, so as to leave only a narrow rib or lug $g$ across its front end. A small spring $g'$ in this groove is fastened at one end to the rear end of the key on the upper side thereof, the spring being adapted to rise upward as it projects forward, as seen in Fig. 1. When the key is inserted, this spring will, of course, be depressed and so will serve by its friction to hold the key in place; but as a further precaution, the extreme front or free end thereof is bent to form a short convex section $g^2$, and immediately above this end of the spring an aperture $f^2$ is made through the sleeve, and the convex end of the spring fits up into the latter a little way,—thus further fastening the key in place. This construction also facilitates the removal of the key, for when the key is to be slipped out from its seat, the spring may be depressed by a pin passed through the aperture in the sleeve, if necessary. I provide however, for removing the key without disturbing the sleeve, by cutting radial notches $c'$, $f^3$ in the front of the chuck head and sleeve; these notches are intended to register with each other, as seen in Fig. 2, and extend back just a little beyond the front rib on the key, so that a suitable pin may be thrust down toward the latter, and used as a lever to force the key from its seat, the curved end of the spring providing for the yielding of the latter to permit this extraction of the key.

The sleeve F, is held from movement lengthwise in its seat, by means of a pin H, inserted in apertures $h$ made in the opposite sides of the chuck head and entering a cross groove $h'$ in the surface of the sleeve with which the openings $h$ register; when this pin is in place, as seen in Fig. 3, of the drawings, it obviously fastens the sleeve against movement lengthwise, it also holds the sleeve against rotary movement, but as a further fastening in this direction, ordinary keys H' may be inserted at the front end, between the sleeve and the chuck head, as seen in Figs. 2 and 3.

In Figs. 4, 5, and 6 a modification is shown in the means for fastening the tap in the chuck or holder. The parts in which no substantial change is made are designated by the same letters as in the preceding figures, but those which are modified so as to make a substantial difference, will be marked with new letters. The chuck, or tubular holder C, is the same as in Fig. 1, with the immaterial exception of the notch $c'$ in the front end thereof. In the circular opening of the head $c$, there is fitted a sleeve I, which differs from the sleeve F, in having its central aperture irregular in shape, as seen in Fig. 5. This aperture is substantially rectangular in general contour, thereby corresponding with the contour of the tap. Each corner is cut out in circular form, however, to provide a space $i$ for the accommodation of the cutting sections $e$ of the tap; and between these spaces are plane faced sections or ribs $i'$, which are adapted to fit upon the flat surfaces $e'$ of the tap, as seen in Fig. 5, and thus hold the latter from turning in the sleeve, the sleeve itself being fastened in place by the cross-pin H and keys H' already described. At the rear end of the holder there is a cap J, fastened upon the threaded end of the holder in place of the ring $d$, this cap has a central perforation for the insertion of a simple rod K, and the latter is detachably connected to the rear end of the tap. This may be accomplished by any suitable temporary fastening; in the drawings, a socket $k$ is made in the end of the rod to receive a tenon $e^2$ on the end of the tap, and the two are temporarily connected together by a removable pin $k'$. In the cap J, there is set a binding screw $j$, by means of which the rod K, is secured in any position desired. This provides means for fastening the tap against longitudinal movement, and also for feeding the latter forward as it is used up by work, as already described. It will be noticed in this modification that the sleeve I, has no threaded section as in the former case.

In Fig. 6, a modification in the front fastening is shown, here the sleeve L, has a plain circular opening $l$, sufficiently large to receive the tap, and in fact, to permit it to be turned therein, but without any means for fastening the latter. In this case the fastening is intended to be the same as at the rear end in Fig. 4, this fastening at this end being relied upon to secure the tap against both rotary and longitudinal movement in its tubular holder.

It is obvious that there may be other changes in the details of construction and in the special fastening devices, without departing from the main feature of my invention, which is to provide a long tap and a long tubular chuck or holder therefor, in which the tap is mounted and secured, but is also adjustable for use as it is worn out.

Having thus described my invention what I claim as new and desire to secure by Letters Patent, is:

1. In a tapping machine, a long tubular chuck or holder C, provided with an enlarged hollow head $c$ at its front end, in combination with a sleeve F, mounted within said hollow head and independently fastened therein, a long tap E, mounted in the holder with its front end passing through said sleeve, a separate fastening device whereby the tap is secured against turning in the sleeve and separate means for securing the tap against lengthwise movement, substantially as described.

2. In a tapping machine, the tubular chuck or holder C, provided with an enlarged front head $c$, in combination with the sleeve F, fixed within said head and provided with a threaded section $f$ partially around its interior, the tap E, arranged in the tubular holder and mounted in said sleeve, and the spring key G, substantially as described.

3. The tubular chuck C, provided with enlarged head $c$, in combination with the sleeve F, fixed in said head and provided with partial threaded section $f$ and recess $f'$, the tap E, arranged within the tube and mounted in the sleeve, and the key G, seated in the recess $f'$ and flat space $e'$ of the tap, and provided with the spring $g'$, substantially as described.

4. The tubular chuck or holder C, provided with enlarged head $c$, and lateral apertures $h$, in combination with the sleeve F, provided with partial threads $f$, recess $f^2$ and cross groove $h'$, the tap E, mounted in said sleeve, the key G, provided with spring $g'$, and the cross-pin H, substantially as described.

5. In a tapping machine, the mandrel B, in combination with a long tubular chuck C, mounted and fixed therein, and provided with enlarged head $c$, the bearing sleeve D, at the rear end of said tube, the fastening collar $d$ fitted to the rear end of the tube, the sleeve F, fixed within the head $c$, the tap E, arranged within the tube and mounted in the sleeve F, and devices for securing the tap against rotary and longitudinal movement, but permitting its adjustment lengthwise, substantially as described.

WILLIAM W. DOOLITTLE.

Witnesses:
A. M. BEST,
H. D. HOLLISTER.